United States Patent

[11] 3,609,699

[72] Inventors William H. Davis;
 Roderick S. Heard, both of Lexington, Ky.
[21] Appl. No. 724,990
[22] Filed Apr. 29, 1968
[45] Patented Sept. 28, 1971
[73] Assignee International Business Machines Corporation
 Armonk, N.Y.

[54] AUTOMATIC MEASURE SELECTION FOR COMPOSER SYSTEM
 15 Claims, 4 Drawing Figs.
[52] U.S. Cl. ................................................. 340/172.5
[51] Int. Cl. ................................................. B41b 3/06
[50] Field of Search ................................... 340/172.5;
 235/157, 151.22; 234/4—10

[56] References Cited
 UNITED STATES PATENTS
 3,165,045 1/1965 Troll ........................... 340/172.5 X
 3,171,592 3/1965 Hanson ....................... 340/172.5 X
 3,234,363 2/1966 Garth et al. .................. 234/8 X
 3,307,154 2/1967 Garth et al. .................. 340/172.5
 3,312,953 4/1967 Wang et al. .................. 340/172.5

Primary Examiner—Raulfe B. Zache
Assistant Examiner—Sydney R. Chirlin
Attorneys—Hanifin & Jancin and D. Kendall Cooper ABSTRACT: The invention relates to an automatic measure selection feature for a composing system having a paper tape input and a printer output. The paper tape is the type commonly used in type setting operations and carries news matter in coded form for operating line casting equipment and the like. Lines of news matter are normally based on a full column width or measure but frequently, as in the case of race results, entries, handicaps, and similar matter, require the intermixing of full column and half column lines. A change in the measure used for justifying the lines is usually made manually by an operator who recognizes visual indicia on the tape indicative of a change in measure. The present system effects an automatic change in measure by accumulating fixed width values of characters in the individual lines as they are recognized, comparing the total fixed width value accumulated with previously entered half column and full column measure values and selecting the appropriate measure to be used for each line on an individual basis. The system also provides for a manual standard measure operation, as well as the automatic operation.

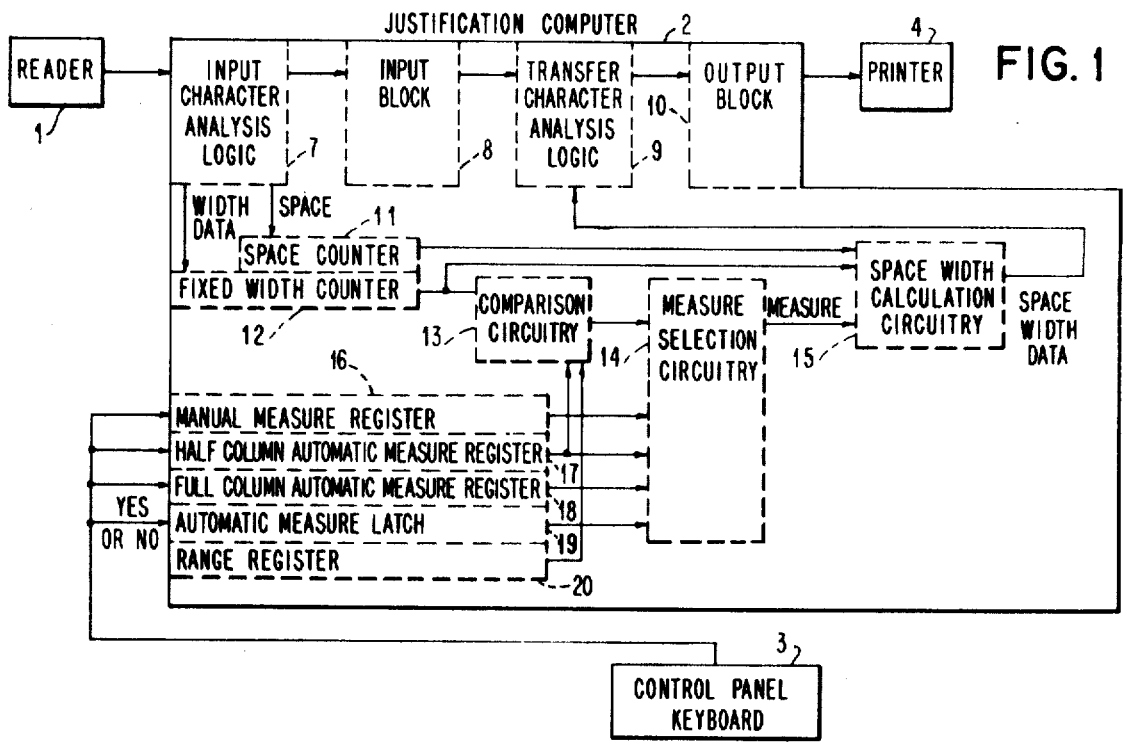

FIG. 1

```
       sde qyyxzzcyz yz914aed30
    Shenandoah   Downs   Entries  Friday
        By  The  Associated  Press
          First Post 7:15  (EDT)
    1st—1,400, cl, 4YO up, 6 f.
    2nd—1,500, cl, 3YO up, 6 f.
    3rd—1,500, cl, 3YO up, 6 f.
    4th—2,500, alc, 2YO, 6 f.
    5th—1,400, cl, 4YO up, 6 f.
    6th—1,700, cl, 4YO up, 6 f.
    7th—1,800, cl, 3YO up, 6 f.
    8th—2,900, alc, 3YO up, 3 1/2 f.
    9th—2,500, alc, 3YO up, 1 1-16 mi.
    10th—1,600, cl, 4YO up, 1 1-16 mi.
             x-5 lbs. aac.
```

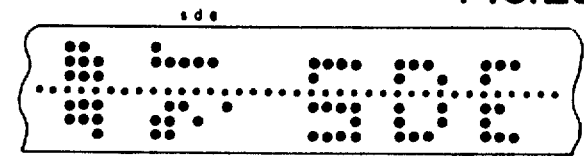

FIG. 2a

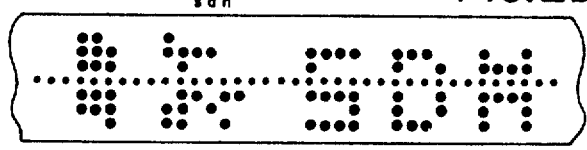

FIG. 2b

```
                    sdh qyyxzzcii    30
1 Shenandoah    -12-
Woods           114
xSky Proof      112
Bud Burgoo      114
Tucker Box      120
xSource Of Life 109
Eli Whitney     120
Hustle Stroke   114
Go Morse Go     120
Pilot Beacon    120
Rhodes Pride    114
Gregory G       120
Fast Pow' Wow   117
2 Shenandoah    -7-
My Gus          117
Born Free       114
Equifleet       110
```

FIG. 3

INVENTORS

WILLIAM H. DAVIS
RODERICK S. HEARD

BY *D. Kendall Cooper*

ATTORNEY

AUTOMATIC MEASURE SELECTION FOR COMPOSER SYSTEM

REFERENCES

IBM "Selectric"*

* Registered Trademark Composer Instruction Manual, Form No. 549-0050, copyright 1966.

IBM "Selectric"*

* Registered Trademark Composer Customer Engineering Instruction Manual, Form No. 241-5340, copyright 1966.

IBM Magnetic Tape "Selectric"*

* Registered Trademark Composer Customer Engineering Instruction Manual, Form No. 241-5430, copyright 1967.

U.S. Pat. application Ser. No. 580,275 (now U.S. Pat. 3,404,766) filed Sept. 19, 1966, with W. H. Castle, et al., as inventors, entitled "Variable Spacebar Mechanism for Automatically Operated Proportional Escapement Printer." U.S. Pat. application Ser. No. 724,552 filed concurrently herewith, with David A Bishop, et al., as inventors, entitled "Composer System for processing Data in Parallel Columns."

BRIEF BACKGROUND OF INVENTION, INCLUDING FIELD AND PRIOR ART

The field of the invention concerns composing systems in general, but especially systems of this nature that are used in the segment of the printing industry concerned with the processing of data arranged in parallel columnar format that require different length line measures based, for example, on one-half and 1 column, or two-thirds and 1⅓ columns, respectively. Newspapers and book publishers are continuously concerned with columnar data. The format of a newspaper usually contemplates the arrangement of news text in parallel columns across the page. Newspapers usually have 6, 7, or 8 columns across the page. Book publishers frequently make use of a similar format. As a further extension of the columnar-type data, much of the information encountered in newspaper work may comprise individual half columns intermixed with the standard column width. Examples of this are race results, entries and handicaps or similar information. The race results and entries are justified on a full column measure, the handicaps on a half column measure.

Newspapers have formed several member organizations to gather and disseminate general news, market reports, and other news matter. Communication is generally via teletype lines, using a modified 5 channel paper tape code. Two well known organizations of this type are the Associated Press and the United Press International. The paper tape media used in the services is referred to as "Presswire." Actually, the paper tape media incorporates a sixth channel primarily included to define various informational and control characters or symbols.

Information sent over the communication lines is fed into two kinds of terminals. One of these, a printer is located in the news room, and provides a hard copy for the editing staff. The other is a six channel punch located in the composing room close to the automatic tape-driven line casters. Systems of this nature were introduced in 1932 with the advent of the "Teletypesetter"* (TTS) tape perforator, (*registered trademark of the Fairchild Graphic Equipment Division of Fairchild Camera and Instrument Corp.).

The TTS tape is fed directly into automatic line casting equipment and because of this comes prejustified. That is, the tape has been composed on a Teletypesetter perforator and contains not only the actual text but identifying data and control codes for the line caster, and sufficient fixed and variable spaces so that when the line is cast it will be justified. The equipment of the nature just described, based on the Teletypesetter composition, assumes a modular font. This is an 18 unit system, the EM space being 18 units in size, the EN space being 9 units in size, and the Thin space being six units in size. Accordingly, EM equals two EN equals three Thin spaces. Justification in systems of this type is accomplished by manipulation (expansion) of space bands within individual lines. Because of the nature of line casters without quadding ability, even lines which are to be set "Flush Left" must contain sufficient fixed space to substantially fill the line out to the intended measure. Then the limited expansion of space bands will cause the type slugs to fill the space between the jaws of the line caster.

Two formats are of primary interest. These are the full column and half column formats. The full column format is used for stock listings, news text, and the like. The half column is used for mutual fund listings, race handicaps, and the like. In some cases, information such as baseball box scores, are set as individual half columns but transmitted over the communication line as full columns of information.

Frequently, it is desirable or necessary to make use of source media, such as the TTS "Presswire" paper tape, based on one unit width schedule in another system that is based on a different unit width schedule. Examples of the latter systems are the IBM "Selectric" Composer and the IBM Magnetic Tape "Selectric" Composer systems that are based on a unit width schedule providing nine units for the widest character. A characteristic difference between a TTS-type system and the IBM systems, as an example, is that the former make use of space ban wedges to achieve uniformity in line widths, while the latter systems make use of spaces whose width is an integral multiple of the basic unit.

When the TTS tape is used in a system based upon a different unit width schedule, and a system that perhaps makes use of a printer as output, discrepancies occur in the setup lines produced by the system due to variances in the unit widths assigned to the different characters.

Some prior systems develop media wherein the individual lines of data each carries justification information and may be identified by particular line ending sequences. In such systems when individual lines comprise two or more columns, uniform width of the columns in the lines is insured by providing justification information for each column, and the columns are justified on an individual basis.

As noted, standardized column widths are used, expressed in multiples of a full column widths (11 to 12 picas): ½, ⅔, 1 and 1 and ⅓. . If the typesetting machine is set up for a column width corresponding to the transmitted width, the copy will be properly justified, but otherwise the typeset copy will be useless.

Normally, for a given transmission, the width is relatively easy to deduce, since changes in width are relatively infrequent; but keeping track of this requires fairly continual attendance of the operator. In some cases transmission widths are intermixed at short intervals on a single tape. Entries and handicaps for horse races constitute a good example.

For each track the entries (full column) are immediately followed by the list of handicaps (half column), with many tracks being listed sequentially. The only indication of a change in width is in the visible code on the tape—no single codes are available to identify changes. There is no reliable way for the machine to identify or read the visible codes, so that operators are required to manually enter width (measure) for each item.

SUMMARY OF INVENTION

Media, such as the paper tape discussed is processed in the present system in a completely automatic manner with proper allowance being made to insure that full columns and half columns are properly justified. Prior to the beginning of the reading operations, the operator enters a full column measure value and a half column measure value into the system. As each line is read, the total escapement of fixed width codes is accumulated. If the total fixed width value accumulated for a particular line is less than the smaller half column measure plus an allowance for overset lines (usually 10 units), the line is set on the smaller half column measure. Otherwise, it is set on the full column measure. The system has provision for bypassing the automatic measure selection in favor of a fixed measure which may be entered manually.

OBJECTS

Accordingly, an object of the present invention is to provide methods and apparatus for automatically selecting a measure required to produce properly justified copy in a composing system.

Another object of the invention is to provide automatic measure selection for a composing system that is predicated upon the recognition and accumulation of fixed width values from the characters themselves and requiring no special code indications.

Still another object of the invention is to provide for automatic measure selection and manual standard measure selection in a composing system.

A further object of the present invention is to provide for automatic measure selection to justify news matter arranged and received with intermixed measures involved.

A particular object of the invention is to produce properly justified full column and half column printed copy, or printed copy based on other columnar relationships with the determination of measures required for justification of the printed copy being effected in an automatic manner.

The foregoing and other objects, features, and advantages of the invention will be apparent from the following more particular description of the preferred embodiment of the invention as illustrated in the accompanying drawings:

DESCRIPTION OF THE DRAWINGS

In the drawings:

FIG. 1 is illustrative of a composing system that is operable for automatic measure selection and standard measure selection.

FIGS. 2a and 2b represent coded paper tape with both coded data and visible data that is normally encountered in newswire typesetting environments.

FIG. 3 represents printed copy produced by the system of FIG. 1 with automatic measure selection occurring as required for the different columnar sizes shown.

SYSTEM ORGANIZATION

The present system overcomes the prior art difficulties by automatic measure selection. This is based upon two facts:

1. Most of the paper tape codes in a line of text represent characters or fixed spaces of known width. In general, the portion of a line taken up by codes of variable width. (spaceband codes) is less than 15 percent of the measure.

2. There are only two measures involved, and these are in approximately a 2:1 ratio; for example, 1 and ½ column or 1⅓ and ⅔ column. Other ratios closer to a 1:1 ratio such as 3:2, etc. can be accommodated by the system.

Because of allowances for gutters, the 2:1 ratio is not exact. Also, the 15 percent limit is not exact because of the tolerance (11 to 12 picas) in the definition of a column and the fact that the IBM Composer system escapements do not always match those assumed by the transmission. This last factor may lead to overset lines in which no room is left for spacebands. A typical setup might be: 1 column measure of 184 units, ½ column measure of 88 units, with 175 units of 1 column or 83 units of ½ column taken up by fixed width codes.

The automatic measure selection requires the manual entry of unit values for the smaller (½ or ⅔ column) and the larger (1 or 1⅓ column) measures. When a line of text is read from tape, the total escapement of fixed width codes is calculated. If this is less than the smaller measure plus an allowance for overset lines (usually 10 units), the line will be set on the smaller measure. Otherwise, it will be set on the larger measure.

Widow lines present no problems in this system because fixed spaces are used to fill out the needed white space. If a quad code (quad left, quad right, or quad center) appears in a line, the measure used is that of the last previous unquadded line. There is provision to bypass automatic measure selection in favor of a fixed measure, which may be entered manually.

This system has the advantage of allowing unattended operation on material which would otherwise require frequent manual measure changes. It also relieves operators from having to identify measure changes, which may be difficult to find by inspection of the tape.

SYSTEM DESCRIPTION

FIG. 1 illustrates a composing machine system for deriving printed justified copy from an original source media, such as the TTS paper tape. The system comprises a number of units including a tape reader 1, a computer 2, a control panel keyboard 3, and a printer 4.

Computer 2 includes Input Analysis logic 7, Input Block (IB) 8, Transfer Character Analysis 9, Output Block (OB) 10, and various other calculation and Control logic and registers. These include a Space counter 11, Fixed Width counter (register) 12, and Comparison Circuitry 13, Measure Selection circuitry 14 and Space Width Calculation circuitry 15.

A Manual measure register 16 receives a standard measure value entered from control panel 3 for use in justifying "Body" type used for general news matter. The Half Column Automatic Measure register 17 and Full Column Automatic Measure register 18 receive measure values corresponding to their titles. An Automatic Measure latch 19, when on (yes) renders automatic Measure Selection effective and when off (no), renders standard measure selection effective.

Reader 1 is assumed to accommodate a tape designated TTS from which various data is derived, including full column and half column data. As the information in the TTS tape is read, it is transferred to the Input Analysis Logic area 7 of Computer 2.

The system reads the characters from the reader into a register within the Input Analysis logic. The input analysis logic 7 may be implemented in a manner described in U.S. Pat. 2,379,862, entitled "Justifying Typewriter," issued July 10, 1945 to Vannevar Bush as described at page 2, Col. 1, line 74 through Col. 2, line 8. Each character or space in a line is placed in Input Block 8 (which may be implemented as a buffer register). The system accumulates an entire line in the Input Block and as each character comes in accumulates width information in Fixed Width counter 12. The width of each individual character is found by table lookup routines and added to this register. The circuit also keeps track of the number of spaces that occur by stepping Space counter 11. Once an entire line is read into Input Block 8, then the circuit calculates width information using one of the line measure values previously entered from control panel 3 and the number of spaces encountered in the line. This will determine how wide the spaces should be in the final copy. (Space Width Calculation Circuitry such as described above may be implemented according to the teachings of the Bush reference at page 2, Col. 2, lines 14–18; page 6 Col. 1, line 65 through page 8, Col. 1, line 53 which presents a complete description of a system for space width calculation suitable for incorporation in the present embodiment.) Once the width of the spaces is determined, the circuit begins to transfer the characters from Input Block 8 to Output Block 10 going through Transfer Character Analysis logic in block 9 (the transfer character analysis logic may be implemented by apparatus constructed according to the teaching of the referenced Bush patent at page 2, Col. 1, lline 74 through Col. 2, line 37). When the circuit reaches a space character, it is replaced by a No-Print character in the appropriate width to allow the right amount of space.

Input Block 8 and Output Block 10 (blocks 8 and 10 may also be implemented according to the teaching of Bush as referenced above) are needed to handle the situation when a space is larger than nine units. In such case, two or more spaces are substituted in place of one in the original data. If the source media is a magnetic tape, for instance, the circuit reads into the Input Block the upper case characters as indicated by a shift bit associated with each character. For output to the printer, it is necessary to have a discrete up-shift code. This has to be inserted before an upper case character. A down-shift code has to be put after it. This also takes up extra space, so that two blocks are needed.

Generally, the data derived from Reader 1 is handled by the system on a line-for-line basis. An overlap occurs however, since when any particular line is transferred to Output Block 10 to be used for operating Printer 4, a next succeeding line can be received in Input Block 8 of the system. The reading of the next succeeding line to the Input Block follows the transfer of the preceding line from the Input Block to the Output Block. Reference is made to the Bishop, et al. application for additional details of a system comparable in many respects to the present system.

USE OF THE RANGE VALUE IN RANGE REGISTER

A register of interest is the Range register 20, which is not controlled from the control panel but is set up internally by the program. This register is used to determine how close to the half column measure the data must come before the half measure is used as opposed to using the full column measure. Range register 20 holds a value which is referred to as an allowance for overset lines and the value is usually 10 units.

The TTS or line caster system is based on 18 unit maximum character width schedule, 18 units maximum and six units minimum. The present system is based on a nine unit maximum width and three unit minimum width. For this reason, Fixed Width counter 12 would hold a different value in the present system than in the TTS system. Because individual characters in the present system may have unit widths slightly more or less than half the TTS unit widths, a given fixed width in TTS may result in a range of values in the present system. Thus, there is a necessity for an allowance which is called the Range.

Accordingly, it is preferable in the present system to adjust the half column measure value upwardly to compensate for a somewhat higher accumulated fixed width value as a line of characters is read. This adjustment (normally 10 units) is taken care of in the control circuitry by the use of the Range register which contains a value which should make up for the overset lines in a typical half column fixed width accumulation. The range value selected is determined arbitrarily but is based upon the likelihood that excess widths from an accumulation of characters having greater than half TTS unit width in one line will be a small percentage of the measure. The fact that the system is working with a full column measure that is nominally twice the value of the half column measure simplifies the routine to some extent. That is it is fairly easy to determine or distinguish between a full column line of data and a half column line of data using the full column and half column measure values, taking the range into account during the calculations at the end of each line.

Typical values are those used in the printed copy for FIG. 3. Full column measure is 220 units, the half column measure is 105 units. The half column measure is generally less than half the full column measure to allow for a gutter (or white space) between half columns (in this case 10 units wide). During operation, the range set in the Range register is taken into consideration with respect to the half column measure by adding to the half column measure value, in this case 105, to determine a larger value within which the fixed width count may fall in order to justify on a half column measure basis. In this case, the 105 entered in the Half Column register has a range of 10 added to it, which means that any line having 115 units or less will be set on the Half Column measure.

Comparison circuit 13 compares the Fixed Width counter and the Half Column Automatic register plus the range for determination of the measure to use. Measure Selection circuitry 14 makes this determination after the comparison.

Space Width Calculation circuitry 15 determines the value or length of each space received in the line. The Space width Calculation circuitry is used every time a space is encountered in the Transfer operation in order to load into the Output Block. No Print characters of appropriate value to achieve output spaces in the printed copy of the proper space length. This aspect of the operation is comparable to that disclosed in the Castle, et al. application.

TYPICAL OPERATION

FIG. 3 illustrates a typical printed copy involving entries at Shenandoah Downs with a first portion that should be justified on a full column measure and handicap information that should be justified on a half column measure. As previously pointed out, the determination of which measure to use is done normally by manual manipulation of the line caster or similar equipment and is based upon recognition by the operator of the visual indicia in the tape with the indicia "SDE," FIG. 2a, (Shenandoah Downs Entries) informing the operator that the following information is to be justified on a full column measure and the indicia "SDH," FIG. 2b, (Shenandoah Downs Handicaps) informing the operator that the following information is to be justified on a half column measure.

In accordance with the present invention, the necessary changes in measure from full column to half column and conversely occurs in an automatic manner and is based upon a comparison of the accumulated fixed width values of the characters in each line upon recognition of the termination of that line against the previously entered half column measure value plus the range adjustment. The printed copy in FIG. 3 includes a first portion starting with "SDE" showing the races for a particular day with each race having an indicated purse value, the horse age categories and the distance to be run, such as six furlongs. Usually, the "SDE" indicia is recognized by the operator of the linecasting equipment who sets the equipment for justification on a full column measure basis.

In the present system, during the reading of this portion of the TTS tape by the reader in FIG. 1, the fixed width unit values of these lines will, as is evident by inspection of FIG. 3, total a larger sum than the half column measure plus the range value.

The comparison is made by Comparison circuitry 13 and based upon this determination, the Measure Selection circuitry 14 selects the previously entered full column measure value in register 18 in order to justify these particular lines. The individual lines in this section of the tape include fixed spaces such as EMS, ENS, and perhaps Thin spaces as well as space bands, all of these being taken into consideration by the present system to achieve Flush Left printed copy using the full column measure for justification purposes.

In the lines shown in this area of copy, the codes on the TTS tape include a number of fixed spaces at the ends of each of the lines that are used by the line casting equipment to set sufficient lead in the line to achieve the required Flush Left output.

The measure calculations are made for each individual input line and each line is set on a measure as determined by the comparison circuitry. This makes it possible as an example to have one line set on half column, a second line immediately following set on full column, another line immediately following back on half column, or any sequence.

AUTOMATIC CHANGE OF MEASURE TO THE HALF COLUMN MEASURE

Following the portions of the tape that includes the purses etc. in FIG. 3, the tape includes a number of instructional type codes with a visible "SDH" shown in FIG. 2b that is recognized by the operator of the line casting equipment to reset or change the measure on the equipment for a short measure. The "SDH" signifies the Shenandoah Downs handicap information.

In the present system, the characters in the individual handicap lines such as "1 shenandoah-12-" are accumulated in Fixed Width counter 12 as usual. In this case, the accumulated value of each of these lines is always somewhat less than the preselected half column measure plus the range or 115 units or less. Therefore, the system makes the necessary selection to justify these lines on a half column measure basis.

Although not used in TTS tapes, quad codes may appear in some tapes prepared for machines which can automatically fill out the white space in a line with fixed spaces. In this case, it is possible for the text to be less than the half column measure, even though it is to be quad center, for instance on a full column measure. To avoid incorrect measure selection, when a line contains a quad code, the Measure Selection circuitry 14 automatically selects the measure used for the preceding unquadded line.

MANUAL MEASURE DETERMINATION

The setting up of the copy received in the TTS tape also involves the recognition and usage of "Body" type and "Agate" type. The race entries just described are normally set in the Agate type, which is a somewhat smaller size. The mixture of full column and half column measure values are encountered only with data based on this particular type size. Other newspaper copy is set with the Body type referred to and when this type of data is encountered on the TTS tape, it is usual to make use of a manual measure value that may be the same or somewhat different from the full or half column measures.

When the Body data is encountered on the tape, it is recognized by the operator of the equipment who then changes the mode of the equipment from the automatic mode to the Manual measure mode for handling of the Body type as it is read from the tape. The change is made by appropriate yes or no entries into Automatic Measure latch 19. In this case, the manual measure value in register 16 is considered by Measure Selection circuitry 14 and no comparison is necessary as is conducted during the Automatic Measure mode.

MACHINE IMPLEMENTED OPERATION

The specific steps to be performed to implement the operation described above are as follows:

1. storing in a measure register two columnar line measures representing full column and half column values;

2. presenting input data signals representing character information where the data signals have a characteristic width value arranged in two columnar line groups according to either the full column or half column stored line measure where each line in each columnar line group includes an end of line signal representative of the last signal in a line;

3. converting the width of the data signals into width values according to a width schedule;

4. accumulating in an input buffer (Input Block 8) character width values as each entire line is provided;

5. detecting the end of line termination signal;

6. selecting by measure selection circuitry for each column line group on the basis of accumulated width values a column line measure of appropriate value from the stored values for full or half column measure;

7. justifying by a justification computer each column line according to its related selected measure; and 8. providing output signals representative of the justified line groups to a printer.

While the invention has been particularly shown and described with reference to a preferred embodiment, it will be understood by those skilled in the art that various changes in form and detail may be made without departure from the spirit and scope of the invention.

What is claimed is:

1. A processing method for producing justified data, comprising:
A. storing in a machine at least two columnar measures having substantially different values;
B. providing by machine input data signals representative of data character information, said signals having characteristic width values and arranged in at least two columnar groups according to one or another of said stored measures;
C. accumulating in a machine width values as each columnar group is provided;
D. selecting by machine for each said columnar group on the basis of accumulated width values a columnar measure of appropriate value from said stored columnar measures;
E. justifying by machine each said columnar group according to its related selected measure;
F. and providing by machine signals representative of said justified columnar groups to a utilizing device.

2. The method of claim 1, wherein:
information provided in step B comprises character signals of fixed width values and character signals of variable width values; and wherein
accumulation in step C is restricted to fixed width values.

3. A processing method for producing justified data comprising:
A. storing in a machine at least two columnar line measures having substantially different values;
b. providing by machine input data signals representative of data character information, said signals having characteristic width values and arranged in at least two columnar line groups according to one or another of said stored columnar line measures and each line in a said columnar line group including a distinctive signal indicative of termination of signals in said line;
C. accumulating in a machine character width values as each columnar line group is provided;
D. detecting by machine each said line termination signal;
E. selecting by machine for each said columnar line group on the basis of accumulated width values a columnar line measure of appropriate value from said stored measures;
F. justifying by machine each said columnar line group according to its related selected measure;
G. and providing by machine signals representative of said justified columnar line groups to a utilizing device.

4. The method of claim 3, wherein:
signals in step B are derived by reading a record media;
and signals in step G are provided to a printer to produce justified printed copy.

5. The method of claim 3, wherein:
said columnar measures are selected from a range of measures including ½, ⅝, 1 and 1½ columns.

6. The method of claim 3, wherein:
selection at step E is based on a comparison of the accumulated fixed width value with the smaller of a plurality of measures.

7. The method of claim 3, wherein:
measures stored are termed larger and smaller in approximately a 2:1 ratio with respect to one another, such as 1 column and ½ column, or 1½ and ⅝ column;
selection at step E is based on a comparison of the accumulated fixed width value with the smaller measure.

8. The method of claim 7, wherein:
said smaller measure is selected when the acculmulated value is less in value than the smaller measure value, and said larger measure is selected when the accumulated value is greater.

9. A processing method for producing justified data, comprising:
A. storing in a machine at least two columnar line measures having substantially different values, said measures being based on a second width schedule;
B. providing by machine input data signals representative of data character information, said signals having characteristic width values according to a first width schedule, and arranged in at least two columnar line groups according to one or another of said stored line measures and each line in a said columnar line group including a distinctive signal indicative of termination of signals in said line;

C. converting by machine the widths of said data signals to width values according to a second width schedule;

D. accumulating in a machine character width values as each line group is provided;

E. detecting by machine each said line termination signal;

F. selecting by machine for each said columnar line group on the basis of accumulated width values a columnar line measure of appropriate value from said stored columnar measures based on said second width schedule;

G. justifying by machine each said columnar line according to its related selected measure;

H. and providing by machine signals representative of said justified columnar line groups to a utilizing device.

10. The method of claim 9 wherein:

signals in step B are derived by reading a Teletypesetter (TTS) tape, based on a TTS width schedule; and character width accumulation, selection of measure and justification in steps D, F, and G are based on a non-TTS schedule.

11. The method of claim 10, wherein:

signals in step H are provided to a printer to produce justified printed copy.

12. The method of claim 9 wherein:

selection at step E is based on a comparison of the accumulated fixed width value with the smaller of a plurality of measures plus a range allowance for overset lines.

13. The method of claim 9, wherein:

measures stored are termed larger and smaller in approximately a 2:1 ratio with respect to one another, such as 1 column and ½ column, or 1½ and ¾ column;

selection at step E is based on a comparison of the accumulated fixed width value with the smaller measure.

14. The method of claim 13, wherein:

said smaller measure is selected when the accumulated value is less in value than the smaller measure value, and said larger measure is selected when the accumulated value is greater.

15. The method of claim 14, wherein:

said smaller measure is modified by a range value, such as 10 units prior to comparison at step E, to compensate for overset lines.